United States Patent
Hendel et al.

(10) Patent No.: US 7,316,787 B2
(45) Date of Patent: Jan. 8, 2008

(54) METHODS FOR CONTROLLING SILICA SCALE IN AQUEOUS SYSTEMS

(75) Inventors: Robert A. Hendel, Chalfont, PA (US); Laibin Yan, Lansdale, PA (US); Longchun Cheng, Pennington, NJ (US)

(73) Assignee: General Electric Company, Schenectady, NY (US)

( * ) Notice: Subject to any disclaimer, the term of this patent is extended or adjusted under 35 U.S.C. 154(b) by 415 days.

(21) Appl. No.: 10/943,745

(22) Filed: Sep. 17, 2004

(65) Prior Publication Data

US 2006/0060816 A1 Mar. 23, 2006

(51) Int. Cl.
*C02F 5/10* (2006.01)

(52) U.S. Cl. .................. 252/180; 252/181; 210/698

(58) Field of Classification Search ............... 252/180, 252/181; 210/698
See application file for complete search history.

(56) References Cited

U.S. PATENT DOCUMENTS

| | | | |
|---|---|---|---|
| 3,875,202 A | 4/1975 | Steckler | |
| 4,399,109 A | 8/1983 | Iler et al. | |
| 4,405,461 A | 9/1983 | Rogers | |
| 4,405,463 A | 9/1983 | Jost et al. | |
| 4,510,059 A | 4/1985 | Amjad et al. | |
| 4,532,047 A | 7/1985 | Dubin | |
| 4,537,684 A | 8/1985 | Gallup et al. | |
| 4,584,104 A | 4/1986 | Dubin | |
| 4,659,481 A | 4/1987 | Chen | |
| 4,717,499 A | 1/1988 | Chen | |
| 4,732,698 A | 3/1988 | Chen | |
| 4,756,888 A | 7/1988 | Gallup et al. | |
| 4,830,766 A | 5/1989 | Gallup et al. | |
| 4,895,663 A | 1/1990 | Chen | |
| 4,933,090 A | 6/1990 | Gill et al. | |
| 5,073,270 A | 12/1991 | Gallup et al. | |
| 5,078,891 A | 1/1992 | Sherwood et al. | |
| 5,100,558 A | 3/1992 | Brown et al. | |
| 5,145,656 A | 9/1992 | Gallup et al. | |
| 5,158,685 A | 10/1992 | Freese | |
| 5,180,498 A | 1/1993 | Chen et al. | |

(Continued)

FOREIGN PATENT DOCUMENTS

WO WO 00/51945 9/2000

OTHER PUBLICATIONS

"Hercules Product Data AQUAFLOW NLS 200 and NHS 300" obtained online @ http://www.herc.com/aqualon/paint/paint_eu_data_sheet/images/pdf_files/37057e4.pdf, (Apr. 2000), pp. 1-2.*

"Acronal Optive 220" obtained online @ http://www.basf.com/businesses/consumer/dispersions/Businesses/Coat/ArchCoat/acronal220.pdf, (Jul. 2001) pp. 1-2.*

(Continued)

*Primary Examiner*—Daniel S. Metzmaier
(74) *Attorney, Agent, or Firm*—Wegman, Hessler & Vanderburg

(57) ABSTRACT

A method of controlling the deposition of silica containing scales and their adhesion to surfaces in contact with an aqueous system is disclosed which comprises adding to the aqueous system about 1-500 ppm of a water-soluble or dispersible hydrophobically modified polyether polymer. Exemplary hydrophobically modified polyether polymers include alkylene oxide hydrophilic backbone repeat units and hydrophobic groups that may be attached to the backbone at a variety of locations such as 1) at the ends of the backbones, 2) either regularly or randomly spaced along the backbone length, or 3) as linking groups to link two or more portions of the backbone together.

10 Claims, 1 Drawing Sheet

U.S. PATENT DOCUMENTS

| | | |
|---|---|---|
| 5,190,664 A | 3/1993 | Gallup et al. |
| 5,200,165 A | 4/1993 | Harper et al. |
| 5,240,687 A | 8/1993 | Gallup et al. |
| 5,256,302 A | 10/1993 | Perez et al. |
| 5,277,823 A | 1/1994 | Hann et al. |
| 5,332,505 A | 7/1994 | Carey et al. |
| 5,393,456 A | 2/1995 | Perez et al. |
| 5,422,010 A | 6/1995 | Carey et al. |
| 5,574,127 A | 11/1996 | Sau |
| 5,575,920 A | 11/1996 | Freese et al. |
| 5,658,465 A | 8/1997 | Nicholas et al. |
| 5,665,242 A | 9/1997 | Gallup |
| 5,705,665 A | 1/1998 | Ichinohe et al. |
| 6,051,142 A | 4/2000 | Roe |
| 6,077,440 A | 6/2000 | Roe et al. |
| 6,153,106 A | 11/2000 | Kelley et al. |
| 6,162,391 A | 12/2000 | Kowata et al. |
| 6,348,509 B1 | 2/2002 | Reeve |
| 6,461,518 B1 | 10/2002 | Demadis et al. |

OTHER PUBLICATIONS

Acrysol® RM-8W Solvent-Free Nonionic Urethane Rheology Modifier for Latex Paints, Rohm and Haas, Jul. 1996 (2 pages).

Aquaflow™ NHS-300 Rheology Modifier for Waterborne Architectural Coatings, Hercules Incorporated, Aqualon Division, Product Data, No. 4201, Nov. 1999 (2 pages).

Good-Rite K-XP212 Copolymer, Material Safety Data Sheet., Noveon, Inc., Nov. 12, 2001 (7 pages).

Additives for Waterborne Industrial Coatings, Cognis Corporation, 2002 (5 pages), month unknown.

Aquaflow® NHS-300 Rheology Modifier, Material Safety Data Sheet No. 999 8000 0036 Version 07, Hercules Incorporated, Aqualon Division, May 19, 2003 (5 pages).

Dai, S., et al., "Rheology and Aggregation Behavior of Hydrophobically Modified Urethane Ethoxylate in Ethylene Glycol—Water Mixtures", *Macromolecules*, American Chemical Society, vol. 36, No. 16, Jul. 9, 2003 (pp. 6260-6266).

Surfynol® 440 Surfactant, Material Safety Data Sheet No. 300000004761, Air Products and Chemicals, Inc, Aug. 4, 2004, (6 pages).

\* cited by examiner

METHODS FOR CONTROLLING SILICA SCALE IN AQUEOUS SYSTEMS

FIELD OF INVENTION

The present invention relates to control of silica deposits in aqueous systems. More particularly, the present invention relates to the inhibition of the formation of silica/silicate deposition in cooling, boiler, membrane based separation and other water systems by use of a water-soluble or dispersible hydrophobically modified polyether polymer.

BACKGROUND OF THE INVENTION

The problems of scale formation and its attendant effects have troubled water systems for years. For instance, scale tends to accumulate on internal walls and surfaces of various water systems, such as boiler and cooling systems and membrane separation systems, thereby materially lessening the operational efficiency of the system.

One particular type of deposit, silica, has proven to be especially troublesome. This invention is directed toward those water systems where silica deposition is most problematic.

In cooling water systems, silica forms a deposit on the metal surfaces that contact the water flowing through the system. In this manner, heat transfer efficiency becomes severely impeded. This, in turn, has a deleterious effect on the overall operating efficiency of the cooling water system. Furthermore, silica scale forms on tower fill resulting in reduced evaporation efficiency and possibly tower fill replacement, among other deleterious effects.

Although steam-generating systems are somewhat different from cooling water systems, they share a common problem in regard to deposit formation. As detailed in the *Betz Handbook of Industrial Water Conditioning*, 8$^{th}$ Edition, 1980, Betz Laboratories, Inc., Trevose, Pa., pages 85-96, the formation of scale and sludge deposits on boiler heating surfaces is a serious problem encountered in steam generation. Although current industrial steam producing systems make use of sophisticated external treatments of the boiler feedwater, e.g., coagulation, filtration, and softening of water prior to its being fed into the boiler system, these operations are only moderately effective. In some cases, silica from various sources, such as muds, sludges, and silts, enters the boiler and act as a scale-forming agent. As is obvious, the deposition of silica on the structural parts of a steam generating system causes poorer circulation and lower heat transfer capacity, resulting accordingly in an overall loss in efficiency.

Membrane and filtration systems are also adversely affected by silica-containing waters. In the case of such separation systems, silica deposition on the membrane and packing material result in a loss of performance as evidenced by reduced throughput and inadequate water quality.

DETAILED DESCRIPTION OF THE INVENTION

Figure 1:
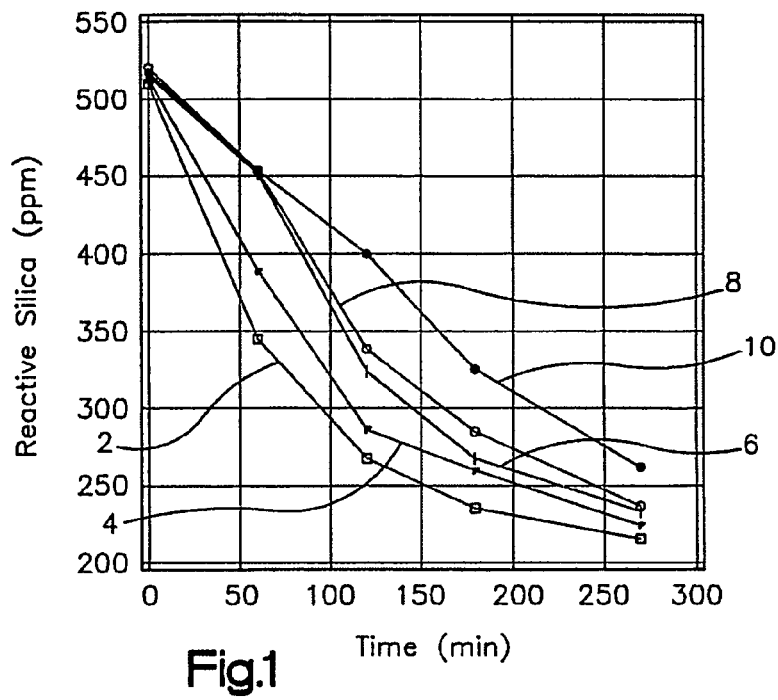
FIG. 1 shows the results of bottle tests comparing treatments in accordance with the invention, comparative treatments, and no treatment. Inventive treatment 10=C12 end-capped PEG 8000/Methylene Copolymer.

In accordance with the invention, it has been found that silica deposition in water systems can be inhibited by adding from about 1-500 ppm, preferably about 1-100 ppm, of a water-soluble or dispersible hydrophobically modified polyether polymer thereto. These polymers are referred to as "Associative Thickener" polymers and include alkylene oxide hydrophilic backbone repeat units and hydrophobic groups that may be attached to the hydrophilic backbone at a variety of locations such as: 1) at the ends of the backbone; 2) either regularly or randomly spaced along the length of the backbone; or 3) as linking groups to link two or more portions of the hydrophilic backbone together. The water-soluble or water dispersible modified polyether polymers may, in addition to the polymerized repeat units formed from polymerization of alkylene oxide, as part of the hydrophilic backbone, include other repeat unit moieties formed from polymerization of urethane, (meth)acrylic acid, acrylate, cellulose and vinyl alcohol. Hydrophobically modified alkylene oxide urethanes may be mentioned as exemplary.

Exemplary "Associative Thickener" polymers are disclosed in U.S. Pat. No. 5,574,127 (Sau)—incorporated by reference herein. These polymers are water-soluble or dispersible copolymers having an acetal or ketal linked polyether backbone that has been end-capped with one or more of a variety of hydrophobic groups. The processes reported in the '127 patent for preparing these polymers comprise, in summary, the reaction of an alpha, omega dihydroxy polyether with a gem dihalide in the presence of a base so as to form an alpha, omega dihydroxy poly[acetal- or ketal-polyether]backbone. The backbone is reacted with a hydrophobic reagent to form the desired end-capped poly(acetal- or ketal-polyether).

Exemplary alpha, omega dihydroxy polyether compounds include, in general, polyethyleneglycol polymers having molecular weights of from about 1,000-50,000. In accordance with the '127 patent disclosure, a particularly useful alpha, omega polyether is PEG (polyethylene glycol) 8000 that is presently commercially available from Aldrich. Exemplary gem-dihalide compounds include dihalogenomethanes such as dibromomethane and dichloromethane. Strong bases capable of reacting with the terminal hydrogens of the formed poly(acetal- or ketal-polyether) are used to form the requisite poly(acetal- or ketal-polyether) dianion. Exemplary bases are alkali metal hydrides, alkali metal hydroxides, alkali metal carbonates, and organic bases.

Preferred processes reported in the '127 patent comprise mixing the polyether with caustic at elevated temperatures followed by copolymerizing the polyether with the gem-dihalide. The resulting reaction product is then end-capped with a suitable hydrophobic reagent. One water-soluble hydrophobically modified polyether that has proven effective in inhibiting silica scale in test water systems is sold by Hercules under the trademark AQUAFLOW™ NHS 300. This product is a hazy white liquid having an actives concentration of about 20% in an aqueous carrier medium. Its reported viscosity is about 4,500 to 7,000 cps. The Mw is reputedly between about 35,000-45,000.

As is further reported in the '127 patent, the water-soluble or dispersible polymer comprises a backbone of poly(acetal- or ketal-polyether) which has ends that are capped with hydrophobic groups. Exemplary hydrophobic groups are independently selected from the group consisting of alkyl, aryl, arylalkyl, cycloaliphatic, perfluroalkyl, carbosilyl, polycyclyl and complex dendrite groups wherein the alkyl, perfluoroalkyl and carbosilyl hydrophobic groups comprise 1 to 40 carbon atoms. More preferably, the aryl, arylalkyl, cycloaliphatic and polycyclic hydrophobic groups comprise about 1 to about 40 carbon atoms. Especially preferred are alkyl hydrophobes having from about 3 to about 22 carbon atoms.

The preferred water-soluble or dispersible hydrophobically modified polyether polymers may be represented by the formula:

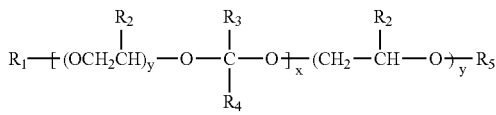

wherein $R_1$ and $R_5$ are independently selected from the group consisting of a hydrophobic group having 1 to 40 carbons or H; $R_2$ is selected from the group consisting of H, alkyl having 1-3 carbons, or a combination thereof; $R_3$ and $R_4$ are independently selected from the group consisting of H, alkyl of 1-6 carbons, and phenyl; y is an integer equal to or greater than about 5 and more preferably from about 5 to about 500; and x is an integer equal to or greater than 1 and more preferably from 1 to about 50.

Particularly preferred are the polymers wherein $R_1$ and $R_5$ are alkyl from about 3-22 carbon atoms and $R_2$, $R_3$, and $R_4$ are all H. Preferably y is about 150-250. Particularly preferred polymers include $C_{12}$ groups for $R_1$ and $R_5$ wherein y is about 180-190.

As is stated in the '127 patent, the polymer has a polyacetal or polyketal polyether backbone that is either linear or branched with linear being presently preferred. The polyethers include any water-soluble polyalkylene oxide or copolymers of polyalkylene oxides. Preferred polyether backbones include polyethylene oxide or water-soluble copolymers of ethylene oxide with another comonomer such as propylene oxide or butylene oxide.

The molecular weight of the polymer may vary between about 500-2,000,000 with a range of 20,000-100,000 being most preferred.

The polymers may be used alone or in combination with other water treating agents. For example, the hydrophobically modified polyether polymers may be used in combination with phosphoric acids and their salts, phosphonic acids and their salts, metal chelating agents, corrosion inhibitors, polymer scale control dispersants, microbiocides, flocculants, coagulants, oxygen scavengers, neutralizing amines, scale inhibitors, acrylic acid polymers and copolymers, maleic acid or maleic anhydride polymers, etc.

Based upon present data, the composition most preferred at this time is 60.075 DI water
0.900 Sodium Molybdate
1.000 Citric Acid
4.00 Alkoxylated alcohol
34.00 AQUAFLOW™ NHS-300 (20% solids)
0.025 Kathon LX—10%-12% actives microbiocide (5-chloro-2-methyl-4-isothazolin-3-one).

All components are listed on % by weight basis and with the composition totaling 100 wt %.

The treatment of the invention may be added to the aqueous system to be treated either on a continuous basis or intermittently. The product is fed so as to result in a dosage of about 1-500 ppm of the hydrophobically modified polyether polymer in the water system, preferably about 1-100 ppm.

The invention is useful in treating silica deposition problems that exist in a broad range of aqueous systems. Silica deposition is most frequently encountered where the water contains various amounts of suspended material such as silt, clay, organic wastes, soluble silica, soluble silicate, polymerized silica, and polymerized silicate. As used herein, the phrase "aqueous system" is used to include any type of system containing water including, but not limited to, cooling water systems, boiler water systems, desalination systems, gas scrubber water systems, evaporator systems, paper manufacturing systems, mining systems, and the like.

EXAMPLES

The invention will now be described in conjunction with the following examples which are offered for illustrative purposes only and should not be construed as limiting the invention.

Bottle Tests

Bottle testing was used to determine treatment efficacy in terms of inhibiting silica polymerization. Silica polymerization was tracked by monitoring the decrease in reactive (monomeric) silica concentrations (via a HACH "silicomolybdate" method). If an inhibitor is effective at inhibiting silica polymerization, then elevated monomeric silica concentrations will result, as compared to lower monomeric silica concentrations for the no treatment case. Such inhibition properties combined with minimal flocking and dispersing properties result in retaining more silica in the bulk water phase, and hence, off of surfaces. In these tests, synthetic waters were prepared by adding constituents batch wise to have specific $Ca^{2+}$, $Mg^{2+}$, $SiO_2$ and M-alkalinity concentrations as well as the desired pH and temperature. Chemicals used included treatment, $NaHCO_3$, $Na_2SiO_3.5H_2O$, $H_2SO_4$, $CaCl_2.2H_2O$ and $MgSO_4.7H_2O$.

FIG. 1 shows the results of bottle tests comparing treatments in accordance with the invention, comparative treatments, and no treatment. Specific water chemistry details were T=30° C., pH=7.2, 500 ppm $Ca^{2+}$(as $CaCO_3$), 250 $Mg^{2+}$(as $CaCO_3$), Initial Reactive Silica=500 ppm $SiO_2$. Reference numerals as shown in the figures indicate the following treatments. Note that silica polymerization is inhibited with less flocking as compared to other highly effective silica polymerization inhibitors such as positively charged oligomers and polymers. Solids formation can lead to scaling and fouling of the aqueous system.

| Reference numeral | |
|---|---|
| 2 | no treatment |
| 4 | 30 ppm - comparative treatment A - known silica control agent |
| 6 | 30 ppm - comparative treatment B - known silica control agent |
| 8 | 30 ppm - PEG 8000 - comparative treatment C |
| 10 | 30 ppm - inventive treatment = $C_{12}$ end-capped PEG 8000/Methylene Copolymer; available Hercules AQUAFLOW ™ NHS 300. (See Examples 4 and 32 U.S. Pat. No. 5,574,127). |

Figure 2:
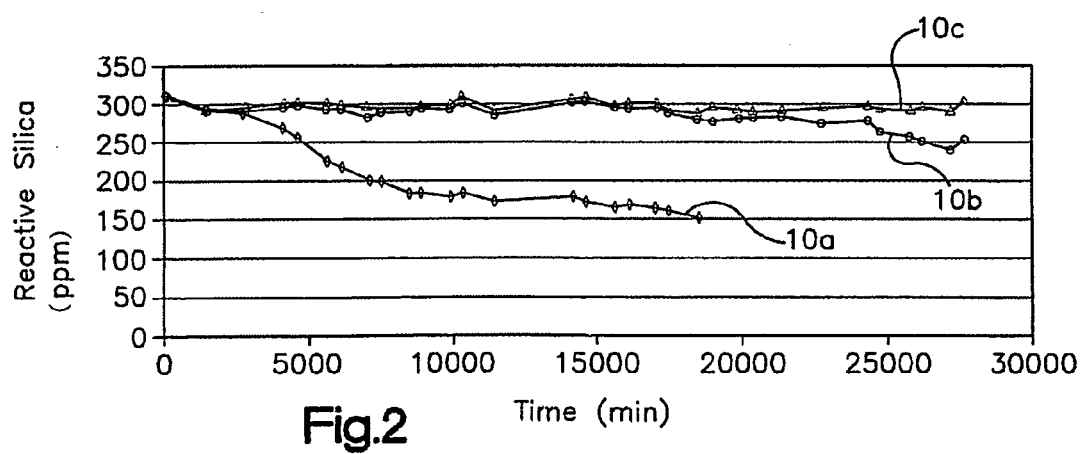
FIG. 2 shows additional bottle test results for the inventive treatment, reference numeral 10, at varying ppm concentration levels, with numeral 10*a* denoting 5 ppm active, numeral 10*b* denoting 10 ppm active, and numeral 10*c* showing 30 ppm active of the polymer identified as 10 above in connection with FIG. 1.

FIG. 2 shows additional bottle test results for the inventive treatment, reference numeral 10, at varying ppm concentration levels, with numeral 10a denoting 5 ppm active, numeral 10*b* denoting 10 ppm active, and numeral 10*c* showing 30 ppm active of the polymer identified as 10 above in connection with FIG. 1. Experimental conditions were: T=30° C., pH 7.0, 1000 ppm $Ca^{2+}$ (as $CaCO_3$), 250 ppm $Mg^{2+}$ (as $CaCO_3$), initial reactive silica=300 ppm $SiO_2$.

The table shows additional silica polymerization inhibition tests under the following conditions: T=30° C.; pH=7.4; Initial Reactive Silica=500 ppm $SiO_2$.

| Time (min) | No Treatment | X-1 Treatment | X-2 Treatment | X-3 Treatment | C-4 |
|---|---|---|---|---|---|
| 0 | 488 | 482 | 480 | 478 | 495 |
| 30 | 430 | 452 | 448 | 448 | 428 |
| 60 | 370 | 438 | 435 | 432 | 362 |
| 120 | 295 | 412 | 410 | 408 | 290 |
| 180 | 258 | 348 | 352 | 355 | 260 |
| 240 | 238 | 348 | 352 | 355 | 238 |
| 300 | 225 | 310 | 330 | 340 | 225 |

X-1 = AQUAFLOW ™ NLS 200, inventive treatment, $C_{16}$ end capped PEG 800/methylene copolymer; available Hercules.
X-2 = AQUAFLOW ™ NLS 210; inventive treatment, $C_{18}$ end capped PEG 800/methylene copolymer; available Hercules.
X-3 = Reference #10 polymer see above.
C-4 = Comparative treatment; ethoxylated acetylenic diol, available Air Products Co. - "Surfynol" 440.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention. For example, the skilled artisan can readily envision that the R groups, namely $R_1$-$R_5$, as per the above formula, can comprise a variety of substitutents such as sulfate, nitrate or phosphate functionality thereon or that these substituents may themselves be directly bonded to the repeat units of the polymer backbone.

What is claimed is:

1. A method of inhibiting deposition of silica and silicate compounds on surfaces in contact with an aqueous system comprising adding to the aqueous system an effective amount for inhibiting the deposition of silica and silicate compounds of an inhibition treatment comprising a water-soluble or dispersible hydrophobically modified polyether polymer, said polyether polymer having a backbone with hydrophobic groups attached thereto wherein said hydrophobic groups comprise a member or members independently selected from the group consisting of alkyl, aryl, arylalkyl, cycloaliphatic, perfluroalkyl, carbosilyl, polycyclyl and complex dendritic groups having about 1 to about 40 carbon atoms.

2. A method of inhibiting deposition of silica and silicate compounds on surfaces in contact with an aqueous system comprising adding to said aqueous system from about 1 to about 500 ppm of a water-soluble or dispersible polymer having the structural formula:

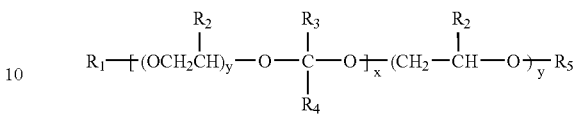

wherein $R_1$ and $R_5$ are independently selected from hydrophobic groups having 1 to 40 carbons or H;

$R_2$ is selected from the group consisting of H, alkyl having 1-3 carbons, or a combination thereof;

$R_3$ and $R_4$ are independently selected from the group consisting of H, alkyl of 1-6 carbons, and phenyl;

y is an integer of equal to or greater than about 5; and x is an integer of equal to or greater than about 1.

3. A method as recited in claim 2 wherein $R_1$ and $R_5$ are alkyl groups having from about 3 to about 22 carbon atoms.

4. A method as recited in claim 3 wherein $R_2$, $R_3$, and $R_4$ are all H and y is about 150-250.

5. A method as recited in claim 1 wherein said backbone has ends that are capped with said hydrophobic groups.

6. A method of inhibiting deposition of silica and silicate compounds on surfaces in contact with an aqueous system comprising adding to the aqueous system an effective amount for inhibiting the deposition of silica and silicate compounds of an inhibition treatment comprising a water-soluble or dispersible hydrophobically modified polyether polymer, wherein said polymer comprises a backbone of poly(acetal- or ketal-polyether) which has ends that are capped with hydrophobic groups.

7. A method as recited in claim 6 wherein said hydrophobic groups comprise a member or members independently selected from the group consisting of alkyl, aryl, arylalkyl, cylcoaliphatic, perfluroalkyl, carbosilyl, polycyclyl, and complex dendritic groups having about 1 to 40 carbon atoms.

8. A method as recited in claim 6 wherein the hydrophobic groups include an alkyl group of about 3 to 18 carbon atoms.

9. A method as recited in claim 8 wherein the alkyl group has about 12 carbon atoms.

10. A method as recited in claim 6 wherein said water-soluble polymer is added to said water system at a dosage of about 1 to 500 ppm.

* * * * *